United States Patent [19]

Pracht et al.

[11] 4,018,688

[45] Apr. 19, 1977

[54] CAPSULES, PROCESS OF THEIR PREPARATION AND FABRIC CONDITIONING COMPOSITION CONTAINING SAID CAPSULES

[75] Inventors: Hans J. Pracht, Cincinnati; Stephen H. Iding, Sharonville, both of Ohio

[73] Assignee: The Procter & Gamble Company, Cincinnati, Ohio

[22] Filed: July 21, 1975

[21] Appl. No.: 597,867

[52] U.S. Cl. .................. 252/8.6; 252/8.7; 252/8.75; 252/8.8; 252/8.9; 252/316

[51] Int. Cl.² ............... B01J 13/00; D06M 13/18; D06M 13/26; D06M 13/34

[58] Field of Search .............. 252/8.6, 8.7, 8.75, 252/8.8, 8.9, 316; 264/4

[56] References Cited

UNITED STATES PATENTS

| | | | |
|---|---|---|---|
| 2,322,821 | 6/1943 | Brown | 260/345 |
| 3,016,308 | 1/1962 | Macaulay | 252/316 X |
| 3,429,827 | 2/1969 | Ruus | 252/316 |
| 3,442,692 | 5/1969 | Gaiser | 8/120 X |
| 3,577,515 | 5/1971 | Vandegaer | 252/316 |
| 3,686,025 | 8/1972 | Morton | 428/219 |
| 3,737,337 | 6/1973 | Schnoring et al. | 252/316 X |
| 3,861,870 | 1/1975 | Edwards et al. | 252/8.6 X |
| 3,870,542 | 3/1975 | Ida et al. | 117/33.3 |
| 3,896,033 | 7/1975 | Grimm | 252/8.8 |

OTHER PUBLICATIONS

Morgan et al., Jour. Poly. Sci XI, 299ff (1959).
Beaman et al., Jour. Poly. Sci. XI, 329ff (1959).
Wittbecker et al., Jour. Poly. Sci. XI, 289ff (1959).

*Primary Examiner*—Allan Lieberman
*Attorney, Agent, or Firm*—Charles R. Wilson; Douglas C. Mohl; Richard C. Witte

[57] ABSTRACT

A capsule contains an inner core of a fabric antistat/softener material and a melting point depressant and an outer wall of a polycondensation product formed by interfacial polymerization. A liquid fabric conditioning composition containing the aforementioned capsules possesses desirable softening and antistat properties.

29 Claims, No Drawings

CAPSULES, PROCESS OF THEIR PREPARATION AND FABRIC CONDITIONING COMPOSITION CONTAINING SAID CAPSULES

BACKGROUND OF THE INVENTION

This invention relates to the production of capsules containing a fabric antistat/softener material and a process for so producing. The present invention additionally relates to a liquid fabric conditioning composition containing the capsules.

In the conventional home laundering process, soiled fabrics are subjected to cleaning with a detergent composition in the main wash cycle and rinsing with water in the final cycle. Optionally, during the rinsing cycle a fabric conditioning composition is added. Such compositions contain a fabric softener or fabric antistat material for imparting to the rinsed fabrics' softening and antistat properties. The rinsed fabrics are oftentimes, thereafter, dried in an automatic clothes dryer.

A long-standing problem has been how to deliver the fabric conditioning agents during the rinse cycle and have the benefits retained after the drying operation. It is difficult to deliver the fabric conditioning agents to the fabrics from a dilute solution such as is encountered in a rinse cycle. Attempts have been made to improve the efficiency of conditioning agent fabric deposition during the laundering process. For example, U.S. Pat. No. 3,442,692 overcomes the problem of delivery to the fabrics by adding the conditioning agent to the automatic dryer.

Another problem has been the attainment of satisfactory antistat properties on the dried fabrics. A static electric charge develops on fabrics during the tumbling of the fabrics in a clothes dryer. Such a charge is objectionable to the consumer because of difficulty it causes in sorting and folding of the dried fabrics. Conventional fabric softener delivered to the fabrics either in the rinse cycle or during the drying operation alleviates the problem of static electricity build up on the fabrics. However, it has been found that when the fabric softener is delivered in the rinse cycle, it hydrates with the water and partly migrates to the inner portions of the fabric. Since the build up of static electricity occurs across the surface portions of fabrics, the most beneficial use of the fabric softener for antistat benefits would be if it would substantially remain on the surface portions.

Treatment of fabrics after the drying operation has also been attempted. For example, U.S. Pat. No. 3,870,542 teaches the treatment of fibrous articles with a composition containing microcapsules. The microcapsules contain a solvent and a fabric conditioning agent. The treatment process comprises applying the microcapsules to the fabric and thereafter breaking the microcapsules to release the solvent solution onto the fibrous article. Such a process is not conducive to home laundering situations. Moreover, the presence of the solvent causes odor problems and is costly.

Copending, commonly assigned patent application Ser. No. 597,938 to Pracht, filed of even date and now abandoned, discloses the production of substantially solvent-free capsules having an inner core of a fabric antistat/softener material and an outer wall of a polycondensation product. A liquid fabric conditioning composition containing the capsules imparts satisfactory antistat control to fabrics rinsed with the composition in that the capsules are ruptured during the drying operation thereby releasing the fabric antistat/softener material onto the fabric surfaces. The capsules are produced by initially forming (1) a solution of melted fabric antistat/softener material having dissolved in it a first monomer capable of forming a polycondensation product along an interface with a second monomer and (2) an aqueous solution having dissolved in it the second monomer. The first solution is added to the aqueous solution under agitation to form capsules along the interface of the two solutions. However, it has been found that the raising of the temperature to melt the fabric antistat/softener makes it (as well as impurities such as water or isopropanol commonly found in commercial samples) more reactive and, hence, more likely to react with the dissolved monomer. This is, of course, undesirable in that it leads to side reactions and subsequent loss of monomer.

It accordingly is an object of this invention to provide a fabric conditioning composition intended for use in a home laundering operation wherein a fabric antistat/softener material can be effectively and efficiently applied to fibrous articles.

Another object of this invention is to provide a liquid fabric conditioning composition adapted to be added during the rinse cycle of the washing process which is capable of providing fabric antistat/softener properties to rinsed fibrous articles.

Still another object of this invention is to provide capsules containing a fabric antistat/softener material.

These and other objects will become apparent from the description which follows.

As used herein all percentages and ratios are by weight unless otherwise indicated.

SUMMARY OF THE INVENTION

A process for producing capsules having an outer wall of a polycondensation product formed from a first and a second monomer along an interface and containing as an inner core a fabric antistat/softener material and melting point depressant, said capsules having a maximum particle dimension of less than 400 microns comprising the steps of:

a. melting a fabric antistat/softener material and adding to it a melting point depressant, whereby the melting point depressant is a silicone oil or a non-aromatic alkyl or alkoxy ether free of functional groups which react with the first monomer and is capable of depressing the melting point of the fabric antistat/softener material by at least 5° C when added at a level below 50% based on the fabric antistat/softener material and has a boiling point greater than 30° C;

b. forming a solution of the melted fabric antistat/softener material and melting point depressant of step (a) with the first monomer;

c. forming an aqueous solution of the second monomer; and d. adding under agitation the solution of step (b) to the solution of step (c) to form the capsules along the interface of the two solutions wherein a degree of stirring is employed such that the maximum particle dimension of the capsules so formed is less than 400 microns.

A liquid fabric conditioning composition contains the capsules formed by the above described process, water and optionally, dyes, perfumes, etc.

DETAILED DESCRIPTION OF THE INVENTION

In accord with this invention, capsules containing an inner core of a fabric antistat/softener material and a melting point depressant and an outer wall of a polycondensation product formed by interfacial polymerization are produced.

Interfacial polymerization reactions are known. Such reactions involve the irreversible polymerization of two fast-reacting intermediates or monomers near the interface of the two phases of a heterogeneous liquid system. For example, Morgan and Kwolek, "Interfacial Polycondensation. II Fundamentals of Polymer Formation at Liquid Interfaces," *Journal of Polymer Science*, Vol XL, Pages 299–327, (1959) describes a process wherein a liquid solution of a suitable monomer dissolved in an organic solvent is added to an aqueous solution containing a second monomer with the monomers reacting to form a polymer at the interface of the two solutions. According to the present invention, interfacial polymerization is used to encapsulate a fabric softener/antistat material.

The fabric antistat/softener materials which form the inner core of the herein described capsules are those water-insoluble (or water dispersible) cationic or non-ionic organic materials which are generally employed as conventional fabric conditioning agents during the rising cycle of the household laundering process. They are organic, waxy materials having a melting (or softening) point between 25° C and 115° C. Such materials possess both fabric softening and fabric antistat properties.

Generally, the cationic nitrogen-containing compounds such as quaternary ammonium compounds and amines have one or two straight-chain organic groups of at least eight carbon atoms. Preferably, they have one or two such groups of from 12 to 22 carbon atoms. Preferred cation-active softener compounds include the quaternary ammonium antistat/softener compounds corresponding to the formula

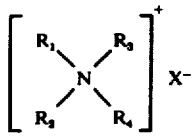

wherein $R_1$ is hydrogen or an aliphatic group of from 1 to 22 carbon atoms; $R_2$ is an aliphatic group having from 12 to 22 carbon atoms; $R^3$ and $R^4$ are each alkyl groups of from 1 to 3 carbon atoms; and X is an anion selected from halogen, acetate, phosphate, nitrate and methyl sulfate radicals.

Because of their excellent softening efficacy and ready availability, preferred cationic antistat/softener compounds of the invention are the dialkyl dimethyl ammonium chlorides, wherein the alkyl groups have from 12 to 22 carbon atoms and are derived from long-chain fatty acids, such as hydrogenated tallow. As employed herein, alkyl is intended as including unsaturated compounds such as are present in alkyl groups derived from naturally occurring fatty oils. The term "tallow" refers to fatty alkyl groups derived from tallow fatty acids. Such fatty acids give rise to quaternary softener compounds wherein $R_1$ and $R_2$ have predominantly from 16 to 18 carbon atoms. The term "coconut" refers to fatty acid groups from coconut oil fatty acids. The coconut-alkyl $R_1$ and $R_2$ groups have from about 8 to about 18 carbon atoms and predominate in $C_{12}$ to $C_{14}$ alkyl groups. Representative examples of quaternary softeners of the invention include tallow trimethyl ammonium chloride; ditallow dimethyl ammonium chloride; ditallow dimethyl ammonium methyl sulfate; dihexadecyl dimethyl ammonium chloride; di(hydrogenated tallow) dimethyl ammonium chloride; dioctadecyl dimethyl ammonium chloride; dieicosyl dimethyl ammonium chloride; didocosyl dimethyl ammonium chloride; di(hydrogenated tallow) dimethyl ammonium methyl sulfate; dihexadecyl diethyl ammonium chloride; dihexadecyl dimethyl ammonium acetate; ditallow dipropyl ammonium phosphate; ditallow dimethyl ammonium nitrate; di(coconut-alkyl) dimethyl ammonium chloride.

An especially preferred class of quaternary ammonium antistat/softeners of the invention correspond to the formula

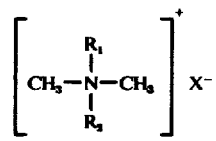

wherein $R_1$ and $R_2$ are each straight chain aliphatic groups of from 12 to 22 carbon atoms and X is halogen, e.g., chloride or methyl sulfate. Especially preferred are ditallow dimethyl ammonium chloride and di(hydrogenated tallow-alkyl) dimethyl ammonium chloride and di(coconut-alkyl) dimethyl ammonium chloride, these compounds being preferred from the standpoint of excellent softening properties and ready availability.

Suitable cation-active amine antistat/softener compounds are the primary, secondary and tertiary amine compounds having at least one straight-chain organic group of from 12 to 22 carbon atoms and 1,3-propylene diamine compounds having a straight-chain organic group of from 12 to 22 carbon atoms. Examples of such softener actives include primary tallow amine; primary hydrogenated-tallow amine; tallow 1,3-propylene diamine; oleyl 1,3-propylene diamine; coconut 1,3-propylene diamine; soya 1,3-propylene diamine and the like.

Other suitable cation-active antistat/softener compounds herein are the quaternary imidazolinium salts. Preferred salts are those conforming to the formula

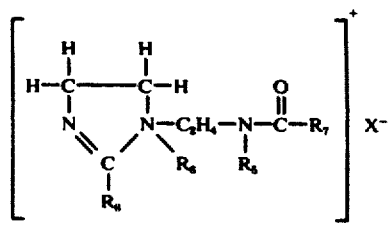

wherein $R_5$ is an alkyl containing from 1 to 4, preferably from 1 to 2 carbon atoms, $R_5$ is an alkyl containing from 1 to 4 carbon atoms or a hydrogen radical, $R_8$ is an alkyl containing from 1 to 22, preferably at least 15 carbon atoms or a hydrogen radical, $R_7$ is an alkyl containing from 8 to 22, preferably at least 15 carbon atoms, and X is an anion, preferably methylsulfate or chloride ions. Other suitable anions include those disclosed with reference to the cationic quaternary ammonium fabric antistat/softeners described hereinbefore. Particularly preferred are those imidazolinium compounds in which both $R_7$ and $R_8$ are alkyls of from 12 to 22 carbon atoms, e.g., 1-methyl-1-[(stearoylamide)ethyl]-2-heptadecyl-4,5-dihydroimidazolinium methyl sulfate; 1-methyl-1-[(palmitoylamide)ethyl]-2-octadecyl-4,5-dihydroimidazolinium chloride.

Other cationic quaternary ammonium fabric antistat/softeners, which are useful herein include, for example, alkyl ($C_{12}$ to $C_{22}$)-pyridinium chloride, alkyl ($C_{12}$ to $C_{22}$)-alkyl ($C_1$ to $C_3$)-morpholinium chlorides, and quaternary derivatives of amino acids and amino esters.

Nonionic fabric antistat/softener materials include a wide variety of materials including sorbitan esters, fatty alcohols and their derivatives, diamine compounds and the like. One preferred type of nonionic fabric antistat/softener material comprises the esterified cyclic dehydration products of sorbitol, i.e., sorbitan ester. Sorbitol, itself prepared by catalytic hydrogenation of glucose, can be dehydrated in well-known fashion to form mixtures of cyclic 1,4- and 1,5-sorbitol anhydrides and small amounts of isosorbides. (See Brown; U.S. Pat. No. 2,322,821; issued June 29, 1943). The resulting complex mixtures of cyclic anhydrides of sorbitol are collectively referred to herein as "sorbitan." It will be recognized that this "sorbitan" mixture will also contain some free uncyclized sorbitol.

Sorbitan ester fabric antistat/softener materials useful herein are prepared by esterifying the "sorbitan" mixture with a fatty acyl group in standard fashion, e.g., by reaction with a fatty ($C_{10}$–$C_{24}$) acid or fatty acid halide. The esterification reaction can occur at any of the available hydroxyl groups, and various mono-, di-, etc., esters can be prepared. In fact, complex mixtures of mono-, di-, tri-, and tetra-esters almost always result from such reactions, and the stoichiometric ratios of the reactants can simply be adjusted to favor the desired reaction product.

The foregoing complex mixtures of esterified cyclic dehydration products of sorbitol (and small amounts of esterified sorbitol) are collectively referred to herein as "sorbitan esters." Sorbitan mono- and di-esters of lauric, myristic, palmitic, stearic and behenic acids are particularly useful herein for conditioning the fabrics being treated. Mixed sorbitan esters, e.g., mixtures of the foregoing esters, and mixtures prepared by esterifying sorbitan with fatty acid mixtures such as the mixed tallow and hydrogenated palm oil fatty acids, are useful herein and are economically attractive. Unsaturated $C_{10}$–$C_{18}$ sorbitan esters, e.g., sorbitan mono-oleate, usually are present in such mixtures. It is to be recognized that all sorbitan esters, and mixtures thereof, which are essentially water-insoluble and which have fatty hydrocarbyl "tails", are useful fabric antistat/softener materials in the context of the present invention.

The preferred alkyl sorbitan ester fabric antistat/softener materials herein comprise sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate, and mixtures thereof, the mixed coconutalkyl sorbitan mono- and di-esters and the mixed tallowalkyl sorbitan mono- and di-esters. The tri- and tetra-esters of sorbitan with lauric; myristic, palmitic, stearic and behenic acids, and mixtures thereof, are also useful herein.

Sorbitan esters of the foregoing type are more fully described and exemplified in the copending application of Wahib N. Zaki; Ser. No. 543,607; filed Jan. 23, 1975. This application is incorporated herein be reference.

Another useful type of nonionic fabric antistat/softener material encompasses the substantially water-insoluble compounds chemically classified as fatty alcohols. Mono-ols, di-ols, and poly-ols having the requisite melting points and water-insolubility properties set forth above are useful herein. Such alcohol-type fabric conditioning materials also include the mono- and di-fatty glycerides which contain at least one "free" OH group.

All manner of water-insoluble, high melting alcohols (including mono- and di-glycerides), are useful herein, inasmuch as all such materials are fabric sustantive. Of course, it is desirable to use those materials which are colorless, so as not to alter the color of the fabrics being treated. Toxicologically acceptable materials which are safe for use in contact with skin should be chosen.

A preferred type of unesterified alcohol useful herein includes the higher melting members of the so-called fatty alcohol class. Although once limited to alcohols obtained from natural fats and oils, the term "fatty alcohols" has come to mean those alcohols which correspond to the alcohols obtainable from fats and oils, and all such alcohols can be made by synthetic processes. Fatty alcohols prepared by the mild oxidation of petroleum products are useful herein.

Another type of material which can be classified as an alcohol and which can be employed as the fabric antistat/softener material in the instant invention encompasses various esters of polyhydric alcohol. Such "ester-alchol" materials which have a melting point within the range recited herein and which are substantially water-insoluble can be employed herein when they contain at least one free hydroxyl group, i.e., when they can be classified chemically as alcohols.

The alcoholic di-esters of glycerol useful herein include both the 1,3-di-glycerides and the 1,2-di-glycerides. In particular, di-glycerides containing two $C_8$–$C_{20}$, preferably $C_{10}$–$C_{18}$, alkyl groups in the molecule are useful fabric conditioning agents.

Non-limiting examples of ester-alcohols useful herein include: glycerol-1,2-dilaurate; glycerol-1,3-dilaurate; glycerol-1,2-myristate; glycerol-1,3-dimyristate; glycerol-1,2-dipalmitate; glycerol-1,3-dipalmitate; glycerol-1,2-distearate and glycerol-1,3-distearate. Mixed glycerides available from mixed tallowalkyl fatty acids, i.e., 1,2-ditallowalkyl glycerol and 1,3-ditallowalkyl glycerol, are economically attractive for use herein. The foregoing ester-alchols are preferred for use herein due to their ready availability from natural fats and oils.

Mono- and di-ether alcohols, especially the $C_{10}$–$C_{18}$ di-ether alcohols having at least one free —OH group, also fall within the definition of alcohols useful as fabric antistat/softener materials herein. The ether-alcohols can be prepared by the classic Williamson ether synthesis. As with the ester-alcohols, the reaction conditions are chosen such that at least one free, unetherified —OH group remains in the molecule.

Ether-alcohols useful herein include glycerol-1,2-dilauryl ether; glycerol-1,3-distearyl ether; and butane tetra-ol-1,2,3-trioctanyl ether.

Yet another type of nonionic fabric conditioning agent useful herein encompasses the substantially water-insoluble or water-dispersible diamine compounds and diamine derivatives. The diamine fabric conditioning agents are selected from the group consisting of particular alkylated or acylated diamine compounds.

Useful diamine compounds have the general formula $$R_1-N(R_2)-(CH_2)_n-N(R_3)-R_4$$

wherein $R_1$ is an alkyl or acyl group containing from about 12 to 20 carbon atoms; $R_2$ and $R_3$ are hydrogen or alkyl of from about 1 to 20 carbon atoms and $R_4$ is hydrogen, $C_{1-20}$ alkyl or $C_{12-20}$ acyl. At least two of $R_2$, $R_3$ and $R_4$ are hydrogen or alkyl containing 1 to 3 carbon atoms, and $n$ is from 2 to 6.

Non-limiting examples of such alkylated diamine compounds include:

$C_{15}H_{33}-N(CH_3)-(CH_2)_3-N(CH_3)_2$
$C_{18}H_{37}-N(CH_3)-(CH_2)_2-N(C_2H_5)_2$
$C_{12}H_{25}-N(CH_3)-(CH_2)_3-HN-C_{12}H_{25}$
$C_{12}H_{25}-N(C_2H_5)-(CH_2)_3-N(C_3H_7)_2$
$R_{Tallow} NH-(CH_2)_3-N(C_2H_5)_2$
$C_{20}H_{41}-N(CH_3)-(CH_2)_2-N(CH_3)_2$
$C_{15}H_{31}-N(C_2H_5)-(CH_2)_3-NH_2$
$C_{18}H_{37}-NH-(CH_2)_3-HN-CH_3$
$C_{16}H_{33}-NH-(CH_2)_3-HN-C_{16}H_{33}$
$R_{Tallow} N(CH_3)-(CH_2)_3-N(C_2H_5)_2$
$C_{16}H_{33}N(CH_3)-(CH_2)_5-N(C_2H_5)_2$
$C_{12}H_{25}N(C_2H_5)-(CH_2)_2-N(C_3H_7)_2$ and
$C_{14}H_{29}N(CH_3)-(CH_2)_3-(CH_3)N-C_8H_{17}$ wherein the above formulas $R_{Tallow}$ is the alkyl group derived from tallow fatty acid.

Other examples of suitable alkylated diamine compounds include N-tetradecyl, N'-propyl-1,3-propanediamine, N-eicosyl,N,N',N'-triethyl-1,2-ethane-diamine and N-octadecyl,N,N',N'-tripropyl-1,3-propanediamine.

Examples of suitable acylated diamine fabric antistat/softener materials include $C_{13-20}$ amido amine derivatives.

The fabric antistat/softeners mentioned above can be used singly or in combination in the practice of the present invention.

The wall constituent of the capsule is a synthetic resin selected from the polyurethanes, polyamides, and polyesters. A polyamide wall constituent is preferred.

The polyurethane resin for the wall constituent is made from toluylene diisocyanate, dimethyl diisocyanate, hexamethylene diisocyanate, xylene diisocyanate, methyl cyclohexane diisocyanate, triphenyl methane diisocyanate and diphenyl methane diisocyanate with a polyvalent amine such as ethylene diamine, hexamethylene diamine, triethyl tetramine, paraphenylene diamino and piperazine, or with a polyvalent hydroxide compound such as 1,4-dihydroxy naphthalene, pyrogallol, 1,4-butadiene diol, glycerin, resorcin, and bisphenol A.

Polyesters are prepared by reacting a halide of polycarboxylic acid such as phthaloyl chloride, 1,4-cyclohexane dicarbonyl chloride, phosgene, 4,4'-bisphenyl dicarbonyl chloride, adipoyl dichloride, sebacoyl chloride and terephthaloyl chloride with a phenolic compound such as resorcin, bisphenol A, 1,4-dihydroxy naphthalene, pyrogallol, phenolphthalein and primary condensation products of phenol resin.

The polyamide is formed by reacting a halide of polycarboxylic acid such as sebacoyl chloride, 4,4'-biphenyl dicarbonyl chloride, phosgene, terephthaloyl dichloride, isophthaloyl dichloride, 1,4-cyclohexane dicarbonyl chloride and adipoyl dichloride with a polyvalent amine such as ethylene diamine, diethylene triamine, hexamethylene diamine, triethylene tetramine, paraphenylene diamine and piperazine.

In accordance with this invention two solutions are initially prepared. One solution contains the fabric antistat/softener material and a melting point depressant and having dissolved therein, as a first monomer, the isocyanate or polycarboxylic acid halide monomer. In that the fabric antistat/softener materials are normally solid, it is necessary to raise their temperature until they are fluid prior to dissolving the first monomer therein. The inclusion of the melting point depressant with the fabric antistat/softener material allows for a lesser temperature rise prior to a fluid state being achieved. The other solution is an aqueous solution of the second monomer. Thus the criteria for the process of this invention is that one of the monomers be water-soluble and -compatible while the other monomer be able to dissolve in the fabric antistat/softener material and be compatible therewith.

The melting point depressant is a silicone oil or a non-aromatic alkyl or alkoxy ether which is free of functional groups which react with the first monomer and which has a boiling point above 30° C, preferably above 60° C. The melting point depressant is added to the fabric antistat/softener material at a level sufficient to lower the melting point of the fabric antistat/softener material by at least 5° C, preferably by at least 10° C. Less than 50%, preferably from 10% to 30 based on the fabric antistat/softener material, of melting point depressant is used.

Examples of suitable melting depressants are the silicone oils, e.g. polydimethylsiloxane, dimethyl- and diethyl-ethylene glycol, dimethyl- and diethyl-propylene glycol, bis (2-ethoxyethyl)ether, 1,1-dimethoxy ethane, 1,2-dimethoxy ethane, dipropoxy methane, and dicyclohexylether.

Inclusion of the melting point depressant with the melted fabric antistat/softener material while remaining fluid at a lower temperature than normal is still able to dissolve the first monomer. Hence, likelihood of an unwanted side reaction between the fabric antistat/softener material (or impurities such as water or isopropanol which are commonly in commercial samples) and the first monomer is diminished.

The aqueous solution of the second monomer contains from 0.1 to 10%, preferably 0.5 to 5% of the monomer. To this solution is added the solution of the fabirc antistat/softener material, melting point depressant and first monomer. The solutions are added in amounts such that a ratio of the first monomer to the second monomer falls within the range of 2:1 to 1:1, preferably 1.1:1. Ideally, a 1:1 ratio of the monomers is used; however, an excess of the first monomer is preferred to ensure a complete reaction and the absence of free polyvalent amines and hydroxyl compounds. The ratio of polycondensation product to fabric antistat/softener material is from 0.5:10 to 3:10, preferably 1:10 to 1.5:10.

The fabric antistat/softener-containing material is added under agitation to the aqueous solution of the second monomer. As the first solution contacts the aqueous solution, capsules are instantly formed at the interface of the two solutions. Formation of the capsules entraps the fabric antistat/softener material and melting point depressant as an inner core.

Size of the capsules is dependent upon the degree of agitation. The greater the agitation the smaller the particle size. The capsules of this invention have a maximum particle dimension of less than 400 microns. Preferably the maximum particle dimension of the capsules ranges from 1 micron to 100 microns, more preferably from 20 microns to 60 microns. Capsules having a maximum particle dimension of greater than 100 microns are visible to the naked eye. Deposition of particles greater than 400 microns onto fabrics would be quite noticeable and objectionable. On the other hand, capsules having a particle size of less than 1 micron are less efficiently entrapped and deposited upon the surface of the fabric. The thickness of the outer wall is dependent on the particular polycondensation product formed; generally the wall thickness ranges from 0.05 microns to 2 microns.

The temperature of reaction of the capsule formation step ranges between room temperature and 70° C. The higher the temperature, the less reaction time necessary to form the desired capsules.

Materials such as dyes, perfumes, humectants, or fillers can be included in either of the reaction solutions without interfering with the process of this invention. Fillers such as clays and inorganic salts are added for controlling the density of the capsules. Preferably the capsules' density is controlled so as to prevent the capsules settling out when added to the hereindescribed liquid fabric conditioning compositions.

Capsules of this invention may be separated from the reaction medium if desired. It has been found that an electrolyte is formed during the polycondensation reaction and, under certain conditions, the presence of the electrolyte in a liquid fabric conditioning composition is objectionable because of its adverse effect on emulsion stability.

The liquid fabric conditioning compositions of this invention consist essentially of about 0.1 to about 15%, preferably 0.5 to 2.5% of the capsule component with the balance being water. Conventional liquid fabric conditioning composition components may be dissolved or dispersed in the composition. These conventional components include fabric softening agents, clay materials, emulsifiers, thickeners, opacifiers, coloring agents, brighteners, fluorescers, pH adjustment agents and perfume materials. Such optional materials generally comprise about 0.1 to 10% by weight of the composition.

Preferably the liquid fabric conditioning compositions of this invention comprises from 1 to 20%, preferably 3 to 7% of cationic fabric antistat/softener materials as defined hereinabove which has not been encapsulated. It has been found that the addition of the unencapsulated fabric antistat/softener material aids in the deposition of the encapsulated material onto the fabrics. It is believed that the unencapsulated fabric antistat/softener material surrounds the capsules; accordingly, the positively charged cationic fabric antistat/softener material is attracted to the negatively charged fabrics and carries with it the capsules of this invention.

Use of the liquid fabric conditioning composition of this invention results in the deposition of the capsules on the surfaces of the fabrics being rinsed. When the fabrics are dried in an automatic clothes dryer, the wall constituent of the capsules ruptures under the influence of heat and friction thereby releasing the fabric antistat/softener material. As a result of this release on the fabric surfaces, the dried fabrics have a very satisfactory antistat benefit imparted to them.

The following examples are illustrative of this invention.

EXAMPLE I

The melting point of 128 grams ditallowdimethyl ammonium methylsulfate (DTDMAMS) is depressed with 40 ml. bis(2-ethoxyethyl)ether to yield a fluid mixture of about 50° C whereas the DTDMAMS alone is normally fluid at about 60° C. To the fluid solution is added 31.3 grams terephthalic acid dichloride. A second solution of 14.4 grams diethylenetriamine, 10.9 grams sodium hydroxide and 1450 ml water is prepared at room temperature. The solution of DTDMAMS is added to the aqueous solution under gentle stirring. Capsules containing the DTDMAMS and bis(2-ethoxyethyl)ether as an inner core and an outer wall of a polyamide formed from the terephthalic acid dichloride and amine are produced. The capsules have a maximum particle dimension ranging from 20 to 60 microns.

Liquid fabric conditioning compositions containing the above-described capsules possess satisfactory antistat control.

EXAMPLE II

Substantially the same results are obtained when polydimethylsiloxane, dimethyl- or diethyl-ethylene glycol and dimethyl- or diethyl-propylene glycol, 1,1-dimethoxy ethane, 1,2-dimethoxy ethane, dipropoxy methane and dicyclohexylether are substituted for the bis(2-ethoxyethyl)ether or Example I.

EXAMPLE III

Capsules having an inner core of DTDMAMS and bis(2-ethoxyethyl)ether and an outer wall of a polyester (formed from phthaloyl chloride and bisphenol A) or an outer wall of a polyurethane (formed from dimethyl diisocyanate and ethylene diamine) are produced using the same procedures as described in Example I.

EXAMPLE IV

Susbsitution of the DTDMAMS of Example I with 1-methyl-1-tallowamidoethyl-2tallow-imidazolinium methylsulfate (essentially free of unsaturated alkyl groups), sorbitan monostearate or N,N-diethyl-N'-stearoyl-ethylene-diamine yields the same results.

EXAMPLE V

The capsules of Example I are tested for antistat control in the following manner. A 5½ lb. test bundle of 53% all-cotton, 12% 65/35 polyester/cotton blend, 17% nylon, and 18% Dacron is washed in a washing machine using a normal 38° C cycle. Forty-five grams of a fabric conditioning composition as indicated below is added in the rinse cycle. The test bundle is dried in a clothes dryer and the process repeated to ensure consistent results. After the second drying, the test bundle is placed in a "Faraday Cage" connected with a volt meter. The bundle is taken out of the cage fabric by fabric and readings are taken at the beginning and after each fabric is removed. The increments are added up and compared versus values obtained from the compositions tested in the same manner as indicated below. Static readings closer to zero are more satisfactory.

| COMPOSITION | | | | |
|---|---|---|---|---|
| COMPONENT | A | B | C | D |
| Water | 100% | 94.6% | 93.4% | 94.6% |
| Ditallowdimethyl ammonium chloride | | 5.2% | 5.2% | — |
| Capsules of Example I | | | 1.2% | 5.2% |
| Perfume and Dye | | Balance | Balance | Balance |

| COMPOSITION | STATIC READING (Volts) |
|---|---|
| A | 200 |
| B | 50 |
| C | 20 |
| D | 30 |

The above results indicate that compositions of this invention, i.e. compositions C and D, possess satisfactory antistat control.

What is claimed is:

1. A capsule having a maximum particle dimension of less than 400 microns, especially adapted for incorporation into a liquid fabric conditioning composition, consisting essentially of an inner core of a fabric antistat/softener material and as a melting point depressant a silicone oil or a non-aromatic alkyl or alkoxy ether which is free of functional groups which react with a monomer used in forming the outer wall, is present at a level such as to be capable of lowering the melting point of said fabric antistat/softener material by at least 5° C, has a boiling point above 30° C and is present at a level less than 50% of said antistat/softener material; and an outer wall of a polycondensation product formed by interfacial polycondensation of two monomers.

2. The capsule of claim 1 wherein the polycondensation product is selected from the group consisting of polyurethanes, polyesters and polyamides.

3. The capsule of claim 2 wherein the polycondensation product is a polyamide.

4. The capsule of claim 1 wherein the fabric antistat/softener compound is a water-insoluble or water-dispersible quaternary ammonium compound, quaternary imidazolinium salt, diamine compound, sorbitan ester, fatty alcohol, fatty alcohol derivative or mixtures thereof.

5. The capsule of claim 1 wherein the capsule has a maximum particle dimension of from 1 micron to 100 microns.

6. The capsule of claim 5 wherein the capsule has a maximum particle dimension of from 20 microns to 60 microns.

7. The capsule of claim 1 wherein the melting point depressant is selected from the group consisting of dimethyl- and diethyl-ethylene glycol, dimethyl- and diethyl-propylene glycol, bis(2-ethoxyethyl)ether, silicone oils, 1,1-dimethoxy ethane, 1,2-dimethoxy ethane, dipropoxy methane, and dicyclohexyl ether.

8. A process for producing capsules having an outer wall of a polycondensation product formed from a first and a second monomer along an interface and containing as an inner core a fabric antistat/softener material and melting point depressant, said capsules having a maximum particle dimension of less than 400 microns, comprising the steps of:
   a. melting a fabric antistat/softener material and adding to it a melting point depressant, whereby the melting point depressant is a silicone oil or a non-aromatic alkyl or alkoxy ether free of functional groups which react with the first monomer, is present at a level such as to be capable of depressing the melting point of the fabric antistat/softener material by at least 5° C, is added at a level below 50% based on the fabric antistat/softener material and has a boiling point greater than 30° C;
   b. forming a solution of the melted fabric antistat/softener material and melting point depressant of step (a) with the first monomer;
   c. forming an aqueous solution of the second monomer; and
   d. adding under agitation the solution of step (b) to the solution of step (c) to form the capsules along the interface of the two solutions wherein a degree of stirring is employed such that the maximum particle dimension of the capsules so formed is less than 400 microns.

9. A process of claim 8 further comprising the step of separating the capsules from the reaction medium.

10. The process of claim 8 wherein the fabric softener/antistat agent is a water-insoluble or water-dispersible quaternary ammonium compound, quaternary imidazolinium salt, diamine compounds, sorbitan ester, fatty alcohol, fatty alcohol derivative or mixtures thereof.

11. The process of claim 10 wherein the polycondensation reaction product is selected from the group consisting of polyurethanes, polyesters and polyamides.

12. The process of claim 11 wherein the ratio of the first monomer to the second monomer is from 2:1 to 1:1.

13. The process of claim 12 wherein the aqueous solution contains from 0.1% to 10% monomer.

14. The process of claim 13 wherein the ratio of polycondensation product formed to fabric antistat/softener material is from 0.5:10 to 3:10.

15. The process of claim 8 wherein the melting point depressant is present at a level from 10% to 30% based on the antistat/softener material.

16. The process of claim 15 wherein the melting point depressant is selected from the group consisting of silicone oils, dimethyl- and diethyl-ethylene glycols, dimethyl- and diethyl-propylene glycols, bis(2-ethoxyethyl)ether, 1,1-dimethoxy ethane, 1,2-dimethoxy ethane, dipropoxy methane and dicyclohexyl ether.

17. The process of claim 8 wherein an inert filler is included in the reaction medium.

18. The process of claim 8 wherein the particle size of the capsules is from 1 micron to 100 microns.

19. The process of claim 8 wherein the particle size of the capsules is from 20 microns to 60 microns.

20. The process of claim 15 wherein the polycondensation reaction product is a polyamide.

21. The process of claim 20 wherein the fabric softener/antistat agent is a water-insoluble or water dispersible quaternary ammonium compound.

22. A liquid fabric conditioning composition, consisting essentially of:
   a. from 0.1% to 15% of capsules having a maximum particle dimension of less than 400 microns, consisting essentially of an inner core of fabric antistat/softener material and, as a melting point depressant, a silicone oil or a non-aromatic alkyl or alkoxy ether which is free of functional groups which react with a monomer used in forming the outer wall, is present at a level such as to be capable of lowering the melting point of said fabric antistat/softener material by at least 5° C, has a boiling point above 30° C and is present at a level less than 50% of said antistat/softener material; and an outer wall of a polycondensation product formed by interfacial polymerization of two monomers; and b. the balance water.

23. The composition of claim 22 wherein the maximum particle dimention of the capsules is from 1 micron to 100 microns.

24. The composition of claim 23 wherein the maximum particle dimension of the capsules is from 20 microns to 60 microns.

25. The composition of claim 22 further containing from 1% to 20% of unencapsulated cationic fabric antistat/softener material acting as a transfer agent for aiding in the deposition of the capsules to fabrics.

26. The composition of claim 22 wherein the polycondensation product is selected from polyurethanes, polyesters and polyamides.

27. The composition of claim 26 wherein the fabric antistat/softener material is selected from the group consisting of water-insoluble or water-dispersible quaternary ammonium compound, quaternary imidazolinium salt, diamine compound, sorbitan ester, fatty alcohol, fatty alcohol derivative or mixtures thereof.

28. The composition of claim 27 wherein the polycondensation product is a polyamide.

29. The composition of claim 27 wherein the melting point depressant is selected from the group consisting of silicone oils, dimethyl- and diethyl-ethylene glycol, dimethyl- and diethyl-propylene glycol, bis(2-ethoxyethyl)ether, 1,1-dimethoxy ethane, 1,2-dimethoxy ethane, dipropoxy methane, and dicyclohexyl ether.

* * * * *

UNITED STATES PATENT OFFICE
CERTIFICATE OF CORRECTION

PATENT NO. : 4,018,688
DATED : April 19, 1977
INVENTOR(S) : Hans J. Pracht and Stephen H. Iding It is certified that error appears in the above-identified patent and that said Letters Patent are hereby corrected as shown below:

Column 3, line 28, delete "rising" and insert -- rinsing --.

Column 3, line 51, delete "$R^3$ and $R^4$" and insert -- $R_3$ and $R_4$ --

Column 6, line 34, delete "alcohol" and insert -- alcohols --.

Column 8, after line 41, insert -- melted fabric antistat/softener is beneficial in that the --.

Signed and Sealed this ninth Day of August 1977

[SEAL]

Attest:

RUTH C. MASON
*Attesting Officer*

C. MARSHALL DANN
*Commissioner of Patents and Trademarks*